Patented Sept. 25, 1928.

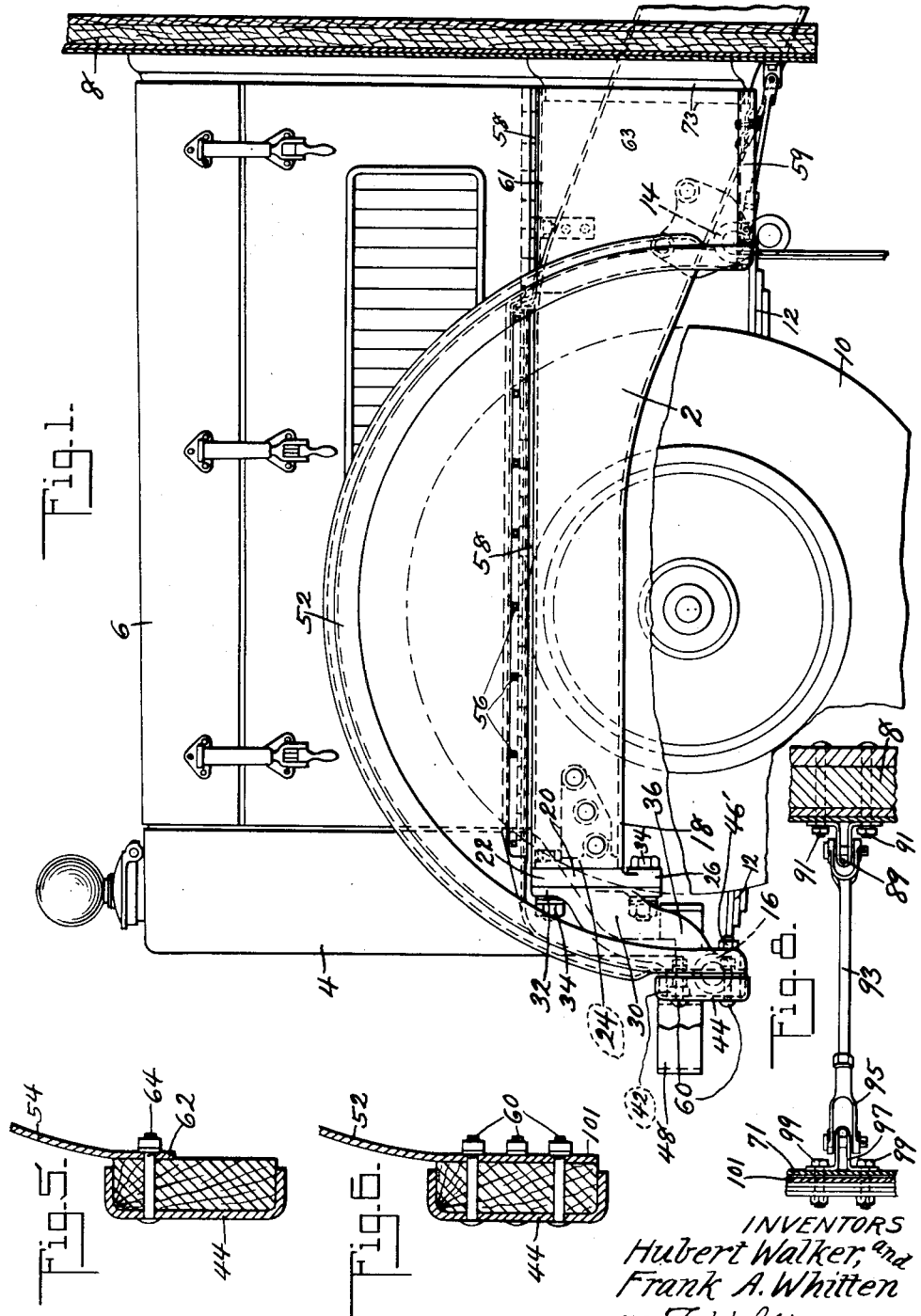

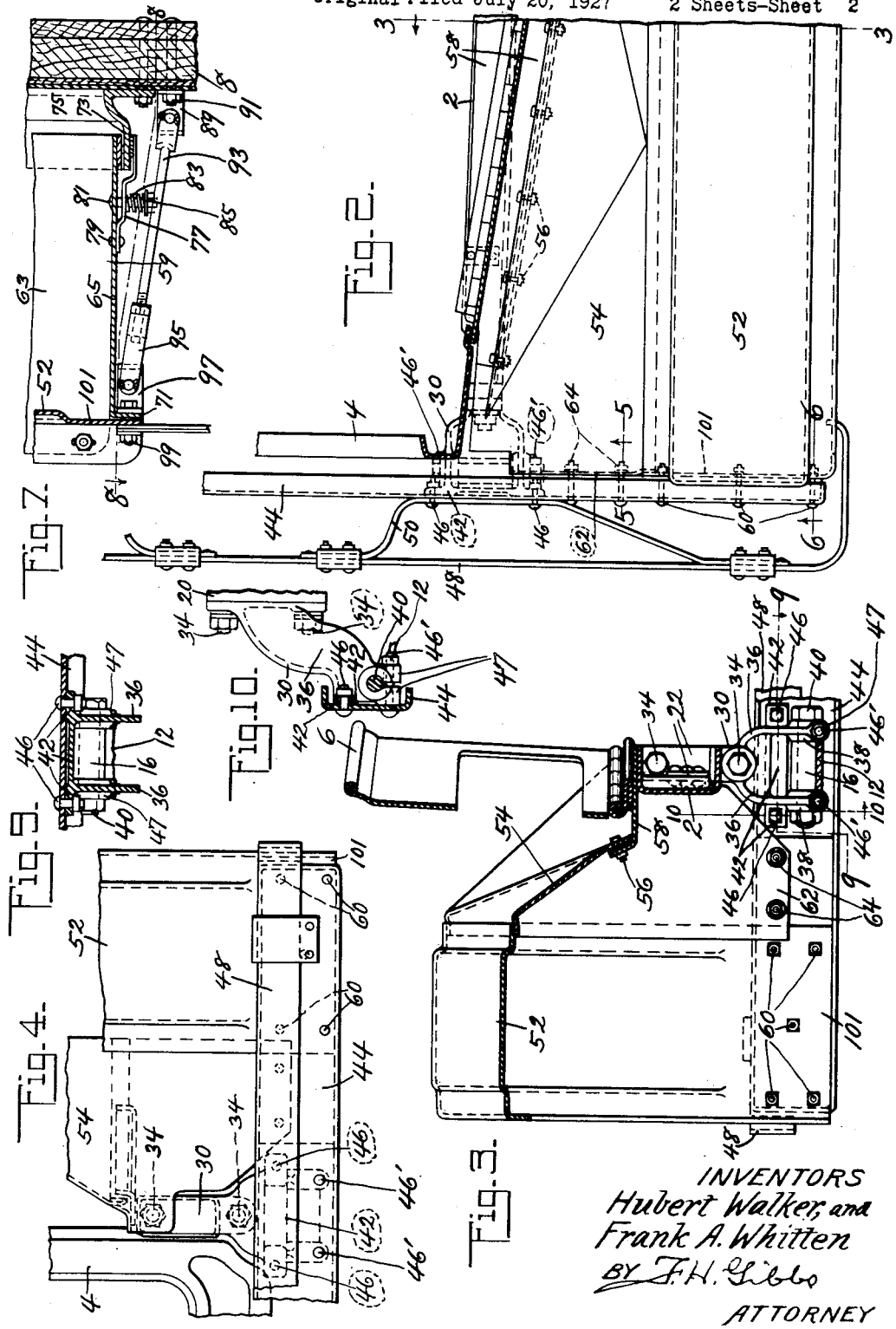

1,685,618

UNITED STATES PATENT OFFICE.

HUBERT WALKER, OF ROYAL OAK, AND FRANK A. WHITTEN, OF DETROIT, MICHIGAN, ASSIGNORS TO AMERICAN CAR AND FOUNDRY MOTORS COMPANY, OF NEW YORK, N. Y., A CORPORATION OF DELAWARE.

VEHICLE BUMPER AND FENDER AND MOUNTING MEANS THEREFOR.

Original application filed July 20, 1927, Serial No. 207,147. Divided and this application filed January 26, 1928. Serial No. 249,590.

Reference is had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In the drawings:
Figure 1 is a side elevation, partly in section, of the front end of a motor vehicle showing the present invention;

Fig. 2 is a fragmentary top plan view, partly in section, of the front end of a motor vehicle showing the present invention applied thereto, the radiator and hood being omitted;

Fig. 3 is a sectional view on the line 3—3, Fig. 2;
Fig. 4 is a front elevation of one of the fenders with its apron and the bumper structure connected therewith, the figure also showing a portion of the radiator;

Fig. 5 is a sectional view on the line 5—5, Fig. 2;

Fig. 6 is a sectional view on the line 6—6, Fig. 2;

Fig. 7 is a detail view, partly in section, showing the connection of the rear end of the fender to the body of the vehicle;

Fig. 8 is a fragmentary detail view, partly in section, showing the specific connection used in connecting the rear end of the fender to the body, taken on the line 8—8, Fig. 7;
Fig. 9 is a sectional view on the line 9—9, Fig. 3; and Fig. 10 is a sectional view on the line 10—10, Fig. 3.

This invention relates generally to motor vehicles and has particular reference to the mounting means for the fenders and bumper of such a vehicle.

The uses to which heavy trucks, buses and the like are subjected necessarily subjects the vehicle body and fenders to extreme vibrations, and the fenders being of heavy material are costly to replace when injured beyond repair. The present invention, therefore, proposes to provide means for positively strengthening the fenders as well as connecting the same in such a manner as to reduce vibration thereof to a minimum.

One object of the present invention is to provide a combination fender brace and bumper which is simple in construction and strong and durable in operation.

A further object of the invention is the provision of a combination fender brace and bumper, which will serve to brace the fenders of a motor vehicle and prevent vibration thereof, and to provide a bumper construction which will prevent injury to the fenders and at the same time connect the fenders together, thereby bracing the latter relative to the vehicle and also relative to each other.

This application is a division of application of Hubert Walker and Frank A. Whitten, filed July 20, 1927, Serial No. 207,147, and the drawings show the invention as applied specifically to a motor vehicle of the bus or truck type in which the fenders and bumper are relatively large and heavy in comparison to those employed in the lighter type of vehicles, such as pleasure cars or the like; but it is to be understood that the invention herein disclosed is equally applicable to pleasure cars or other like vehicles within the spirit and scope of this invention.

Other objects and advantages of the present invention will be apparent from the following description taken with the accompanying drawings in which, in Fig. 1, the front end of a motor vehicle is shown which comprises a chassis frame side member 2 of channel form, a radiator 4, hood 6, and a dash 8.

As is usual, wheels 10 are provided, the same being mounted by springs 12 secured to the rear shackle 14 and front shackle 16.

The chassis side member terminates in a straight forward end portion 18 which has secured to the extreme end thereof a main or attaching bracket 20 formed with a head portion 22 having a reduced portion 24 forming a shoulder which closely fits within the channel, as clearly shown in Fig. 1; the head portion abutting the end of the channel and having its lower end extended below the channel, as shown at 26. Extending rearwardly from the reduced end of the head portion is an attaching leg by which the main bracket is secured by bolts, rivets or the like to the web of the side frame member 2.

The main bracket 20 serves to support an auxiliary bracket 30, preferably of the form shown in Fig. 1, said bracket depending from the bracket 20 and having an upper attaching face 32 complemental with the face of the head portion 22 and secured to the latter by bolts 34 or the like.

Referring to Figs. 3 and 9, it can be seen that the lower end of the auxiliary bracket 30 is bifurcated, being formed into the spaced arms 36 which terminate in eyes 38 in which the shackle bolt 40 of the forward end of the spring 12 is mounted. Secured across the spaced arms 36 or formed integral therewith is an attaching plate 42 which serves to mount a bumper channel 44 attached thereto by bolts 46 or the like, which channel extends entirely across the front of the vehicle. For further securing the bumper channel 44, bolts 46' are provided which extend through the said channel and through lugs 47 formed with the eyes 38, thus also securing the shackle bolt 40 as will be obvious. In the drawings, only one side of the vehicle is shown, but it is to be understood that the construction herein described is duplicated on the other side of the vehicle. The bumper channel mounts a bumper 48 of any desired or suitable construction by means of the spring mounts 50.

The vehicle fender or mudguard is designated as 52, and 54 indicates the fender apron, the latter being secured by bolts 56 to a tie plate 58 mounted on the side member 2. The fender is connected at its rear end to the vehicle body in any suitable or desired manner; for example, in a manner indicated and described in our co-pending application heretofore mentioned.

Referring to Figs. 1, 7 and 8 of the drawings herein, a sill 59 is secured to the tie plate 58 at the rear end thereof, the same being provided with an attaching portion 61, a vertical web 63, and a horizontal portion 65 which latter extends between the lower rear end of the fender and the body of the vehicle; the end of the horizontal portion 65 adjacent the lower end of the fender being downwardly flanged as shown at 71, and the opposite end of the sill 59 is extended over a supporting flange 73 formed as a part of a casting indicated generally at 75, the casting being secured to the dash 8 of the vehicle by suitable bolts as shown. It will be apparent that the sill, being connected to the tie plate, is therefore, in effect, connected to the fender as well as the apron and, of course, is movable therewith. It has been found desirable to so arrange and construct the specific parts as to permit relative movement between the fender and sill and the vehicle body, but such connections should be such as to retain the several parts in assembled position. To that end we provide a resilient connection between the horizontal portion 65 of the sill and the supporting flange 73 of the casting, the same comprising a plurality of spring pressed retainers 77 attached to the horizontal portion 65 by rivets 79, and the free ends of said retainers extend under the supporting flange 73. A bolt 81 is provided for each retainer, the bolts each carrying a spring 83 interposed between the retainer and a nut 85 carried by the bolt. With the construction just described it is apparent that the connection between the attaching flange 73 and the horizontal portion 65 is a resilient one, and the bolts and retainer elements function to maintain a proper positioning of the horizontal portion of the sill with respect to the flange 73, and hence the vehicle body.

Due to the strains to which a vehicle is subjected, as before-mentioned, it has been found that a rigid connection of the sill 59 with the frame is undesirable and presents disadvantages in that sometimes the fender will be broken or bent. Further, after continued use a rigid connection will become loose and result in relative movement between the parts and a consequent rattling. To eliminate these disadvantages and still maintain the desired construction of these elements of the vehicle, we provide a generally flexible connection between the rear end of the fender and the body of the vehicle, more particularly the dash thereof, the same comprising a plurality of adjustable connecting members, one of which is particularly shown in Figs. 7 and 8, and comprises a bracket 89 secured to the dash of the vehicle by bolts 91 or the like, said bracket pivotally supporting the bifurcated rear end of the tie rod 93. The free end of the tie rod 93 is threaded to secure a clevis 95 which is pivotally connected to a bracket 97 positioned beneath the horizontal portion of the sill and secured thereto, more particularly to the flange 71 by means of bolts 99 which extend through the flange and through the lower end of the fender; the latter being flattened as shown at 101 to provide an attaching surface. Any number of these tie connections may be employed within the spirit and scope of the present invention as will be apparent, and the specific construction of the sill may be varied to suit various designs of vehicles; the essence of the present invention being to provide a flexible connection between the rear end of the fender and the body of the vehicle, more particularly the dash thereof, whereby to permit relative vertical movements between the fender and the dash of the vehicle during normal use of the latter. The fender is in general of standard construction, but its forward end is extended downwardly for a distance greater than is usual in vehicles of present-day usage, and its extreme end is flattened to form an attaching surface which is arranged just adjacent the bumper channel and is secured to said bumper channel by bolts 60 or the like, thus reinforcing the fender and providing a rigid connection thereof with the bumper channel. It is to be noted here that the fender for its entire width at its extreme end is straightened or flattened to mate with the bumper channel, thus affording a positive connection of the fender and bumper channel and reinforcing said fender.

Means are provided also for reinforcing the apron, and to effect this the end of the apron is extended adjacent the bumper channel to form an attaching flange 62, the flange being secured to the bumper channel by bolts 64 or the like, as clearly shown in Fig. 5.

From the above description it is believed that the construction of the present invention will be fully apparent to those skilled in the art, but attention is called to the fact that an end construction for motor vehicles has been provided which includes the fenders, the aprons, and a bumper channel rigidly secured to the chassis frame side members and to which bumper channel the fenders and aprons are rigidly attached, thereby reinforcing the fenders and aprons and protecting the same against injury and also serving to provide a construction in which vibration of the fenders and aprons is reduced to a minimum.

What is claimed is:

1. In a motor vehicle having a chassis side member and a body, a bracket secured to and depending from the end of said side member, a bumper channel attached to the bracket, a fender secured to the side member with its front end secured to the bumper channel, and means connecting the rear end of said fender to the body.

2. In a motor vehicle, a chassis side member, a bumper channel mounted by said side member and a fender secured to the side member and having its forward end flattened to provide an attaching surface arranged in contact with the bumper channel and secured thereto.

3. In a motor vehicle, a chassis side member, a bracket secured to the side member in abutting relation, a bumper channel secured to the bracket, and a fender attached to the side member and having its forward end secured to the bumper channel.

4. In a motor vehicle having a chassis side member, a bracket secured within and depending from the end thereof, a bumper channel secured to the bracket, and a fender secured to the side member and to the bumper channel.

5. In a motor vehicle, a chassis side member, a fender and an apron, and means for reinforcing the fender and apron and for preventing relative vibration between the vehicle and fender and apron comprising a supporting bar connected to the side member and to which the fender and apron are rigidly attached.

6. In a motor vehicle, a bumper channel, a fender provided at its forward end with an attaching portion arranged against the bumper channel, means connecting the bumper channel and fender at the attaching portion, and an apron extending adjacent the bumper channel and secured thereto.

7. In a motor vehicle, a bumper channel, a fender having its forward end formed into an attaching portion and secured to said bumper channel, and an apron having a flanged forward end secured to the bumper channel.

8. In a motor vehicle, a chassis side member, a bracket secured at the end thereof, a bumper channel carried by the bracket, a fender secured at its front end to the bumper channel, and an apron supporting the fender and secured at its front end to the bumper channel.

9. In a motor vehicle having a chassis side member and a body, a bumper channel connected to the side member, and a fender rigidly secured to the side member and bumper channel and flexibly connected to the body.

10. In a motor vehicle, a chassis side member, and a body, a bumper channel connected to the side member, an apron rigidly secured to the side member and bumper channel, and a fender supported by the apron, said fender being rigidly secured to the bumper channel and flexibly connected to the body.

11. In a motor vehicle, in combination with a chassis side member and a body, a bumper channel rigidly connected to the side member, a fender rigidly secured to the bumper channel to reinforce said fender and prevent vibration thereof relative to the bumper channel and flexibly connected to the body to permit relative movement between the rear end of said fender and said body.

12. An end construction for motor vehicles comprising in combination with a chassis side member and a spring, a bracket secured to the end of the chassis side member for supporting one end of the spring, a bumper channel supported by the bracket, a fender having its forward end secured to the bumper channel, and an apron supporting the fender and secured at its front end to the bumper channel.

13. An end construction for motor vehicles, comprising in combination with the chassis side member, a bumper channel connected to the side member, a fender having its forward end secured to the bumper channel, and an apron adjacent the fender and secured to the bumper channel.

14. The combination with a vehicle chassis and a bumper channel supported thereby, of fenders and fender aprons secured to the chassis and to the bumper channel.

In witness whereof we have hereunto set our hands.

HUBERT WALKER.
FRANK A. WHITTEN.